United States Patent
Wang et al.

(10) Patent No.: US 6,579,203 B2
(45) Date of Patent: Jun. 17, 2003

(54) CLEARANCE TAKE-UP JOINT FOR AN ADJUSTABLE MECHANISM

(76) Inventors: Liang-Hsiung Wang, No. 207, Kung Yuan N. Rd., Tainan (TW); Lien-Lin Wang, No. 207, Kung Yuan N. Rd., Tainan (TW)

( * ) Notice: Subject to any disclaimer, the term of this patent is extended or adjusted under 35 U.S.C. 154(b) by 0 days.

(21) Appl. No.: 10/037,649

(22) Filed: Jan. 3, 2002

(65) Prior Publication Data

US 2002/0091029 A1 Jul. 11, 2002

(30) Foreign Application Priority Data

Jan. 8, 2001 (TW) ...................................... 90200297 U

(51) Int. Cl.$^7$ ................................................. F16H 1/32
(52) U.S. Cl. ...................................... 475/162; 297/362
(58) Field of Search ................................ 475/162, 175; 297/362

(56) References Cited

U.S. PATENT DOCUMENTS

| | | | | |
|---|---|---|---|---|
| 4,371,207 A | * | 2/1983 | Wilking et al. ............. | 475/162 |
| 4,407,544 A | * | 10/1983 | Barhring ..................... | 475/162 |
| 5,277,672 A | * | 1/1994 | Droulon et al. ............. | 475/162 |
| 5,524,970 A | * | 6/1996 | Kienke et al. .............. | 297/362 |
| 6,076,889 A | * | 6/2000 | Su et al. .................... | 475/162 |

* cited by examiner

Primary Examiner—Sherry Estremsky
(74) Attorney, Agent, or Firm—Pearne & Gordon LLP

(57) ABSTRACT

A joint has a first leaf having an inner gear and a second leaf having an external gear meshing with the inner gear. A driving wedge-shaped disk is non-rotatably attached to a shaft and rotatably received between the leaves. A block with an outer wedge-shaped resistant surface is formed on the driving wedge-shaped disk. At least one driven wedge-shaped segment is mounted around the driving wedge-shaped disk. Each segment has an inner wedge-shaped surface to mate with the outer wedge-shaped resistant surface of block. A wedge arrangement is arranged between a supporting base on the disk and each segment to raise the segment as the driving wedge-shaped disk is rotated with the shaft. Accordingly, the angle between the first leaf and the second leaf can be adjusted. In addition, the shaking of the second leaf with respect to the first leaf can be prevented.

14 Claims, 8 Drawing Sheets

CLEARANCE TAKE-UP JOINT FOR AN ADJUSTABLE MECHANISM

BACKGROUND OF THE INVENTION

1. Field of the Invention

The present invention relates to a joint, and more particularly to a clearance take-up joint for a seat adjustable mechanism and which can prevent any possible shaking of the seatback with respect to the seat.

2. Description of Related Art

Clearance take-up joints are used with seatback adjustment mechanisms, seat height adjustment mechanisms and power windows to eliminate the clearance between gear assemblies. With reference to FIGS. 8 and 9, a conventional clearance take-up joint in accordance with the prior art comprises a stationary gear plate (60), a rotary gear plate (70), a gear coupler (80) and two discs (82). The joint is particularly suited for use with a seatback adjustment mechanism. Each gear plate (60, 70) has teeth (61, 71) formed on the inner periphery of the gear plate (60, 70). The rotary gear plate (70) is supported by a bearing race (73), with multiple ball bearings (72) mounted between the gear plate (70) and the bearing race (73).

The gear coupler (80) has two sets of teeth (not numbered) formed on the outer periphery of the gear coupler to respectively mesh with the teeth (61, 71) of the gear plates (60, 70). A central bore (81) is defined in the gear coupler (80) to mount the pair of discs (82).

Each disc (82) has a central hole (821) through which a shaft (90) is installed. A hollow notch (822) is formed at the lower portion of the central hole (821) in each disk (82). An arcuate window (823) is formed in each disk (82) to collectively hold a resilient member (83) that presses one of the discs (82) to the right and the other of the discs (82) to the left. In addition, the shaft (90) has a lug (91) that extends into the hollow notches (822) in the two discs (82).

When the shaft (90) is stationary, the discs (82) will be pushed by the force provided by the resilient member (83) to be offset to each other and to abut the inner surface of central bore (81) in the gear coupler (80). Some teeth on the gear coupler (80) will mesh with the teeth (61, 71) in the gear plates (60, 70). Consequently, the gear plates (60, 70) will not rotate relative to each other due to the engagement of the teeth (61, 71) of the gear plates (60, 70) and the gear coupler (80). The inclination of the seatback relative to the seat is fixed.

When the shaft (90) is turned, the lug (91) on the shaft (90) will push the hollow notch (822) in one of the discs (82) to rotate to overlap with the other disc (82) more. Consequently, a gap will be defined between the inner surface of the central bore (81) of the gear coupler (80) and the discs (82). A clearance will occur for the teeth on the gear coupler (80) to release from the teeth (61, 71) in the gear plates (60, 70). Consequently, the rotary gear plate (70) can freely rotate relative to the stationary gear (60). The inclination of the seatback can be adjusted.

From the foregoing, it is clear that this conventional joint has the disadvantage of the existence of friction between the discs (82) themselves and between the discs (82) and the gear plates (60, 70). If the friction is larger than the force produced by the resilient member (83) that outspreads the gear plates (60, 70), excessive clearance will occur between the meshing teeth of the gear coupler (80) and the teeth (61, 71) of the gear plates (60, 70). Therefore, the seatback may shake with respect to the seat.

Furthermore, because the resilient member (83) is arranged in the arcuate windows (823) in the discs (82), two ends of the resilient member (83) are respectively located at different longitudinal levels. To install the resilient member (83) in the discs (82) is difficult. In addition, the resilient member (83) will deform irregularly, and the resilient member's (83) elasticity will be lost in a short time. The resilient member (83) cannot provide an enough outspreading or expanding force to the discs (82), and a gap will be generated between the gear coupler (80) and the teeth (61, 71) of gear plate (60, 70). The seatback easily shakes with respect to the seat.

To overcome the shortcomings, the present invention tends to provide an improved clearance take-up joint to mitigate or obviate the aforementioned problems.

SUMMARY OF THE INVENTION

The main objective of the invention is to provide an improved joint for adjusting the inclination of a seatback, which can prevent any shaking of the seatback with respect to the seat. The clearance take-up joint has a first leaf, a second leaf, a driving wedge-shaped disk and two driven wedge-shaped segments. A block with an outer wedge-shaped resistant surface is formed on the driving wedge-shaped disk. A wedge arrangement is formed between the supporting base and each segment to raise the segment as the driving wedge-shaped disk is rotated with a shaft. Therefore, each segment is moved in the axial direction along the driving wedge-shaped disk by means of the wedge arrangement between the supporting base and the segment. Sufficient clearance will occur between the meshing teeth of the gears so as to unlock the second leaf from the first leaf, which ensures the smooth rotation of the second leaf with respect to the first leaf. The angle between the second leaf and the first leaf can be adjusted.

Other objects, advantages and novel features of the invention will become more apparent from the following detailed description when taken in conjunction with the accompanying drawings.

DETAILED DESCRIPTION OF PREFERRED EMBODIMENT

Figure 1:
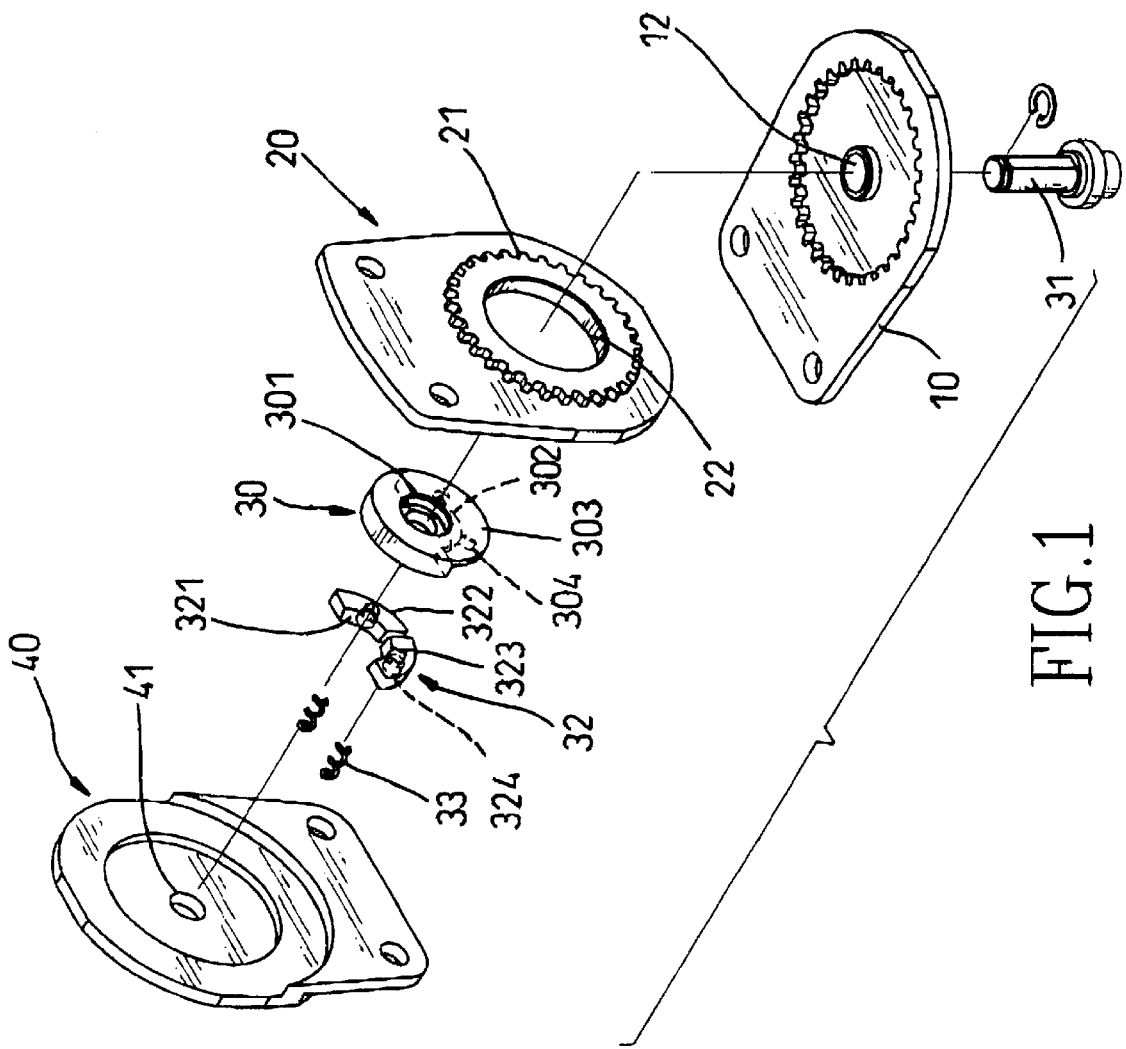
FIG. 1 is an exploded perspective view of a first preferred embodiment of a joint in accordance with the present invention for adjusting the inclination of a seatback relative to a seat.
Figure 2:
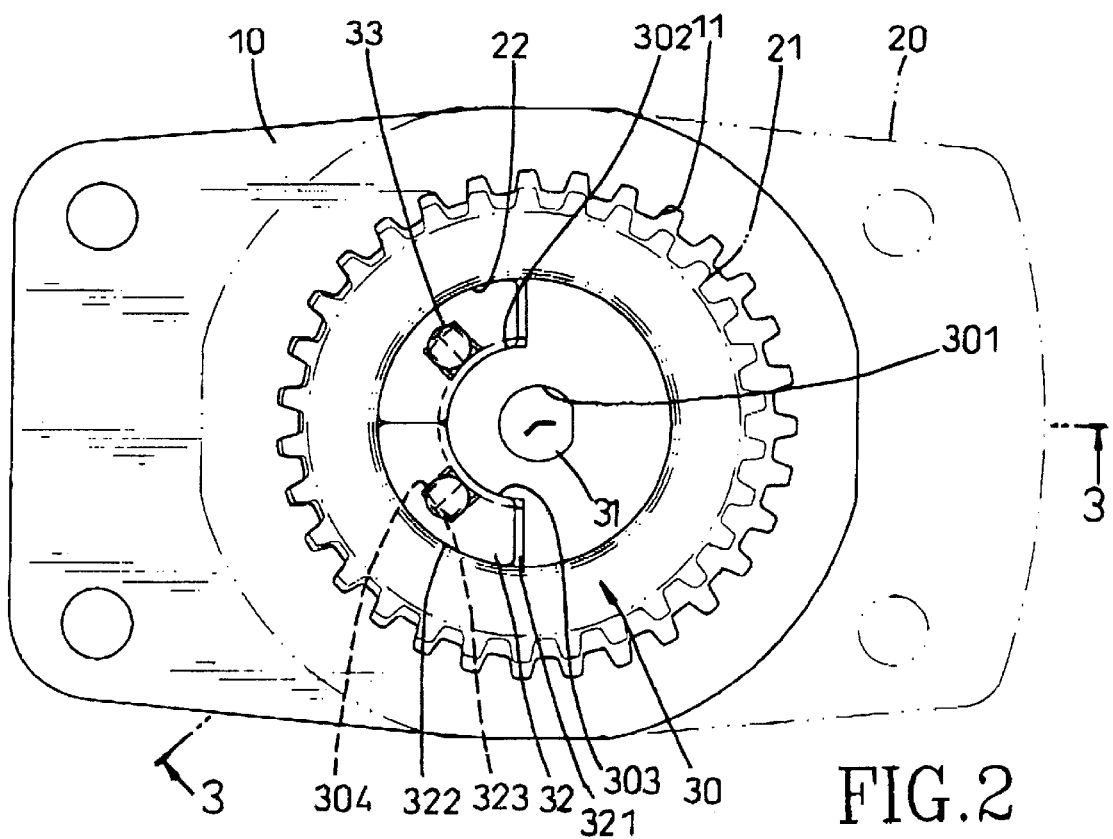
FIG. 2 is a plan view in partial section of the joint in FIG. 1.
Figure 3:
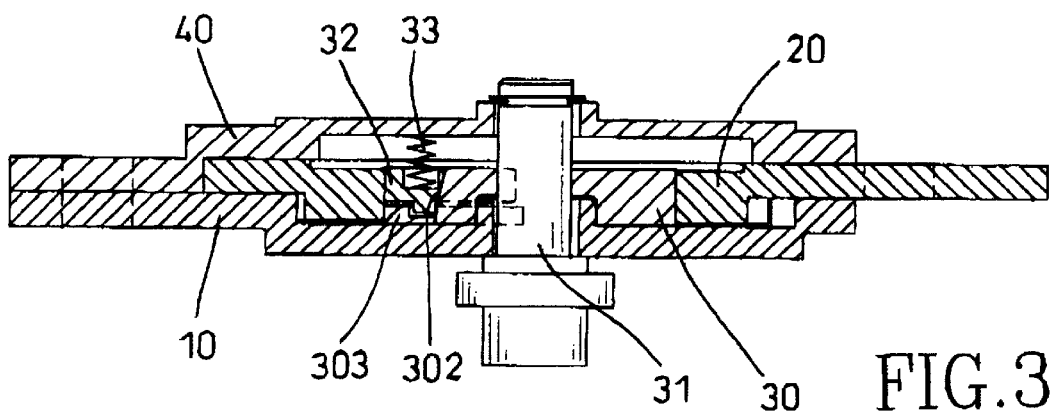
FIG. 3 is a plan view in partial section of the joint in FIG. 1.

With reference to FIGS. 1 to 3, a clearance take-up joint in accordance with the present invention comprises a first leaf (10), a second leaf (20), a driving wedge-shaped disk (30), two driven wedge-shaped segments (32) and a cap (40). The joint is used to adjust the inclination of a seatback with respect to an automobile seat.

An inner gear (11) is formed in the first leaf (10). An external gear (21) with an outer diameter smaller than an inner diameter of the inner gear (11) of the first leaf (10), such that the external gear (21) can mesh with the inner gear (11). An axial hole (12) is defined in the first leaf (10) at the central of the inner gear (11). A central hole (22) is defined in the second leaf (20), and the external gear (21) is formed concentrically around the central hole (22). The cap (40) is fixed to the first leaf (10) such that the second leaf (20) is positioned between first leaf (10) and cap (40). An aperture (41) is defined in the cap (40) and aligns with the central hole (22) in the second leaf (20) and the axial hole (12) in the first leaf (10).

The driving wedge-shaped disk (30) is received in the central hole (22) in the second leaf (20). A non-circular hole (301) is defined in the driving wedge-shaped disk (30). A supporting base (303) with a thickness less than that of the driving wedge-shaped disk (30) is integrally formed on the driving wedge-shaped disk (30). At least one wedge-shaped recess (304) is defined in the supporting base (303). A block (302) with a wedge-shaped resistant surface integrally protrudes from the disk (30) at the side facing the cap (40) and around the hole (301).

At least one driven wedge-shaped segment (32) is mounted around the driving wedge-shaped disk (30). Each driven wedge-shaped segment (32) is slightly rotatable around and movable axially along the driving wedge-shaped disk (30) when the shaft is rotated. Each driven wedge-shaped segment (32) has an inner wedge-shaped surface (321) and an outer periphery (322). The inner wedge-shaped surface (321) of each segment (32) mates with the wedge-shaped resistant surface of the block (302) on the driving wedge-shaped disk (30). The outer periphery (322) of each segment (32) abuts against the inner surface of the central hole (22) in the second leaf (20). Consequently, the driven wedge-shaped segments (32) are engaged between the inner surface of the central hole (22) in the second leaf (20) and wedge-shaped resistant surface of block (302) of the driving wedge-shaped disk (30). At least one wedge portion (323) is formed on each segment (32) to correspond to one of the wedge-shaped recesses (304) on the supporting base (303), such that a wedge arrangement is arranged between each segment (32) and the supporting base (303). In another embodiment, at least one wedge-shaped recess (304) is defined in each driven wedge-shaped segment (32), and a corresponding wedge portion (323) is formed on the supporting base (303). With such a wedge arrangement between the supporting base (303) and each driven wedge-shaped segment (32), each segment (32) will be moved along the axial direction of the driving wedge-shaped disk (30) as the driving wedge-shaped disk (30) rotates.

A resilient member (33) is mounted between the cap (40) and each driven wedge-shaped segment (32) to provide a pushing force on the segment (32). In practice, the resilient member (33) is a spring. A recess (324) is defined in each segment (32) to receive one end of the spring.

A shaft (31) extends through the axial hole (12) in the first leaf (10), the non-circular hole in the driving wedge-shaped disk (30) and the aperture (41) in the cap (40).

With reference to FIGS. 2 and 3, if the user wants to change the angle between the seatback and the seat, the shaft (31) is rotated first. The driving wedge-shaped disk (30) is rotated with the shaft (31) so that the inner surfaces of the wedge-shaped recesses (304) on the supporting base (303) will push against the corresponding wedge portions (323) on the driven wedge-shaped segments (32). Thus each segment (32) is moved in the axial direction along the driving wedge-shaped disk (30) by means of the wedge arrangement between the supporting base (303) and the segment (32). When each driven wedge-shaped segment (32) moves away from the supporting base (303), there will be a space for the segment (32) radially moving relative to the inner surface of the central hole (22) in the second leaf (20) and the wedge-shaped resistant surface of block (302). The outer periphery (322) of each segment (32) will leave the location abutting the inner surface of the central hole (22) in the second leaf (20). Accordingly, sufficient clearance will occur between the meshing teeth of the gears (11, 21) so as to unlock the second leaf (20) from the first leaf (10). This ensures the smooth rotation of the external gears (21) of the second leaf (20) with respect to the inner gear (11) of the first leaf (10). The angle between the second leaf (20) and the first leaf (10) can be adjusted.

The rotation of the shaft (31) is stopped when the leaves (10, 20) are adjusted to a desired angle. The segments (32) are engaged with the inner surface of central hole (22) and the wedge-shaped resistant surface of block (302) again under the action of the compressed resilient member (324). Therefore, the external gear (21) of the second leaf (20) is pushed outwardly to mesh with the inner gear (11) of the first leaf (10). Accordingly, the external gear (21) will tightly and steady engage with the inner gear (11) without a gap between the meshing teeth of the gears (11, 12). This prevents any possible shaking of the second leaf (20) with respect to the first leaf (10).

In addition, a first gap is defined between the driven wedge-shaped segments (32) and the supporting base (303), and a second gap is defined between each wedge portion (323) and the corresponding wedge-shaped recess (304). Consequently, when clearance occurs between the two gears (11, 21) due to the gear wear after a long time of use, the resilient members (33) will push the driven wedge-shaped segments (32) to move closely relative to the supporting base (303). This can compensate the clearance between two gears (11, 21).

Figure 4:
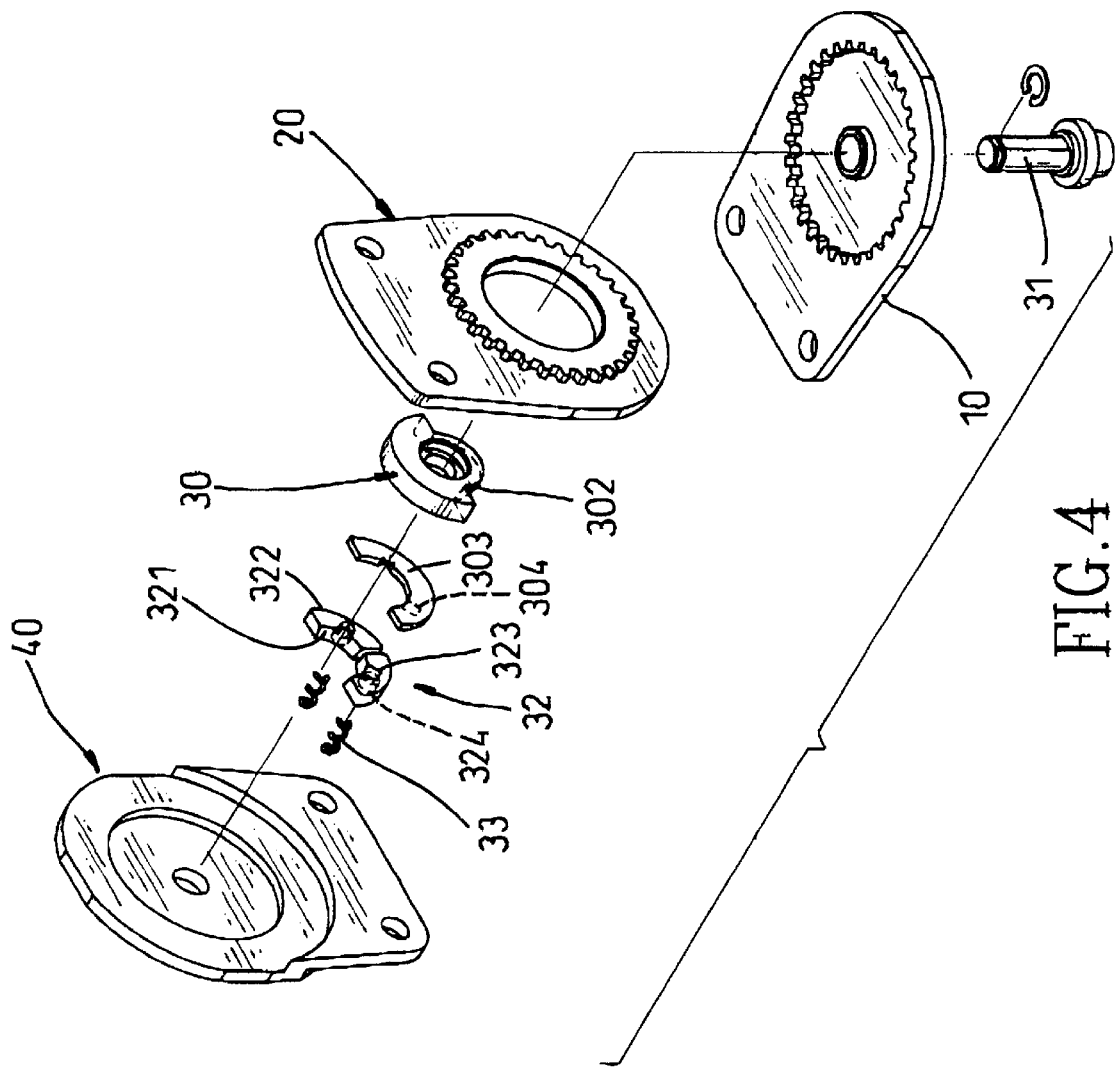
FIG. 4 is an exploded perspective view of a second preferred embodiment of a joint in accordance with the present invention for adjusting the inclination of a seatback relative to a seat.

With reference to FIG. 4, the driving wedge-shaped disk (30) and the supporting base (303) are made separately.

Figure 5:
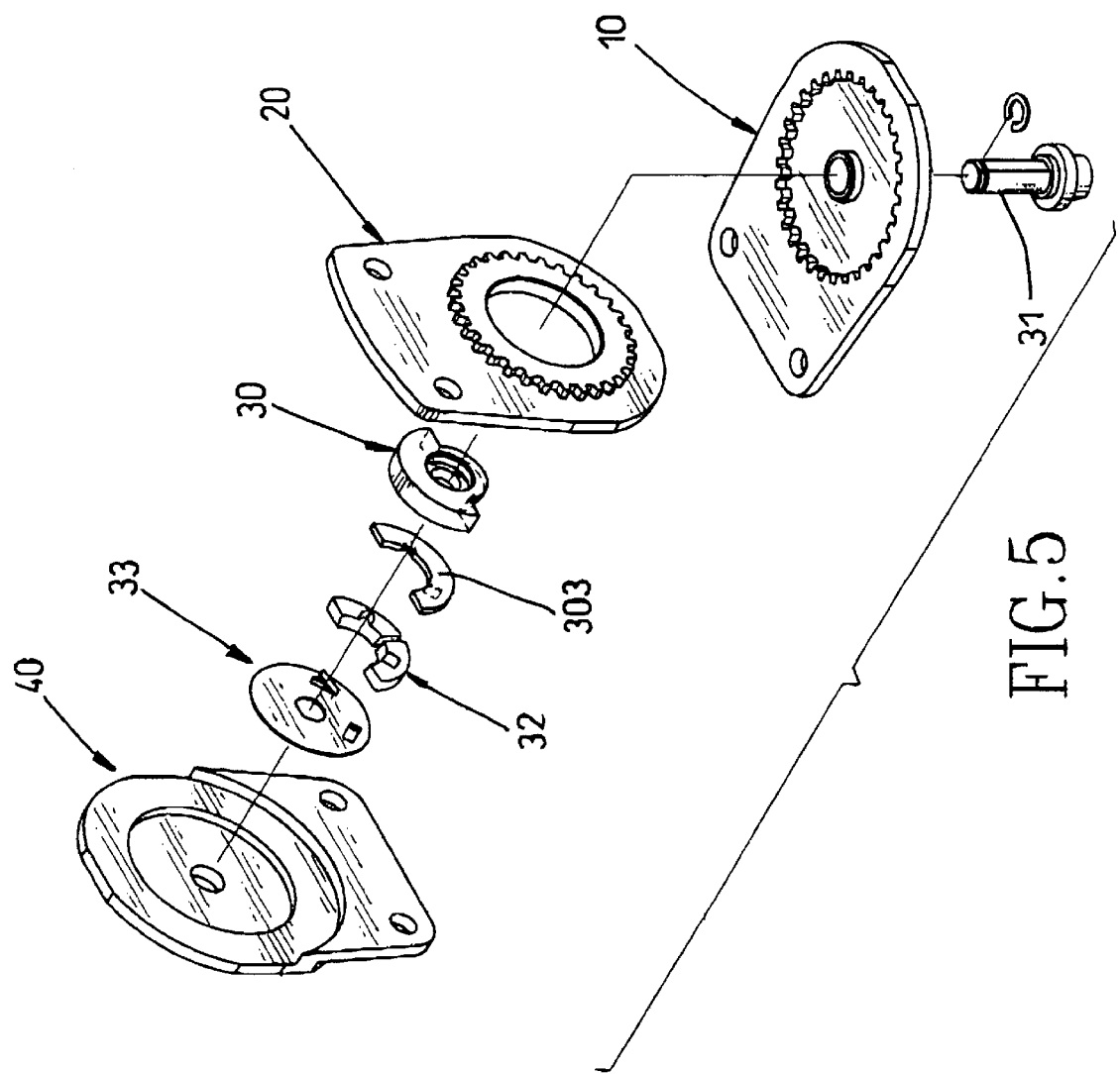
FIG. 5 is an exploded perspective view of a third preferred embodiment of a joint in accordance with the present invention for adjusting the inclination of a seatback relative to a seat.

With reference to FIG. 5, the resilient member (33) pressing each segment (32) is a resilient tab integrally formed on a disk (33).

Figure 6:
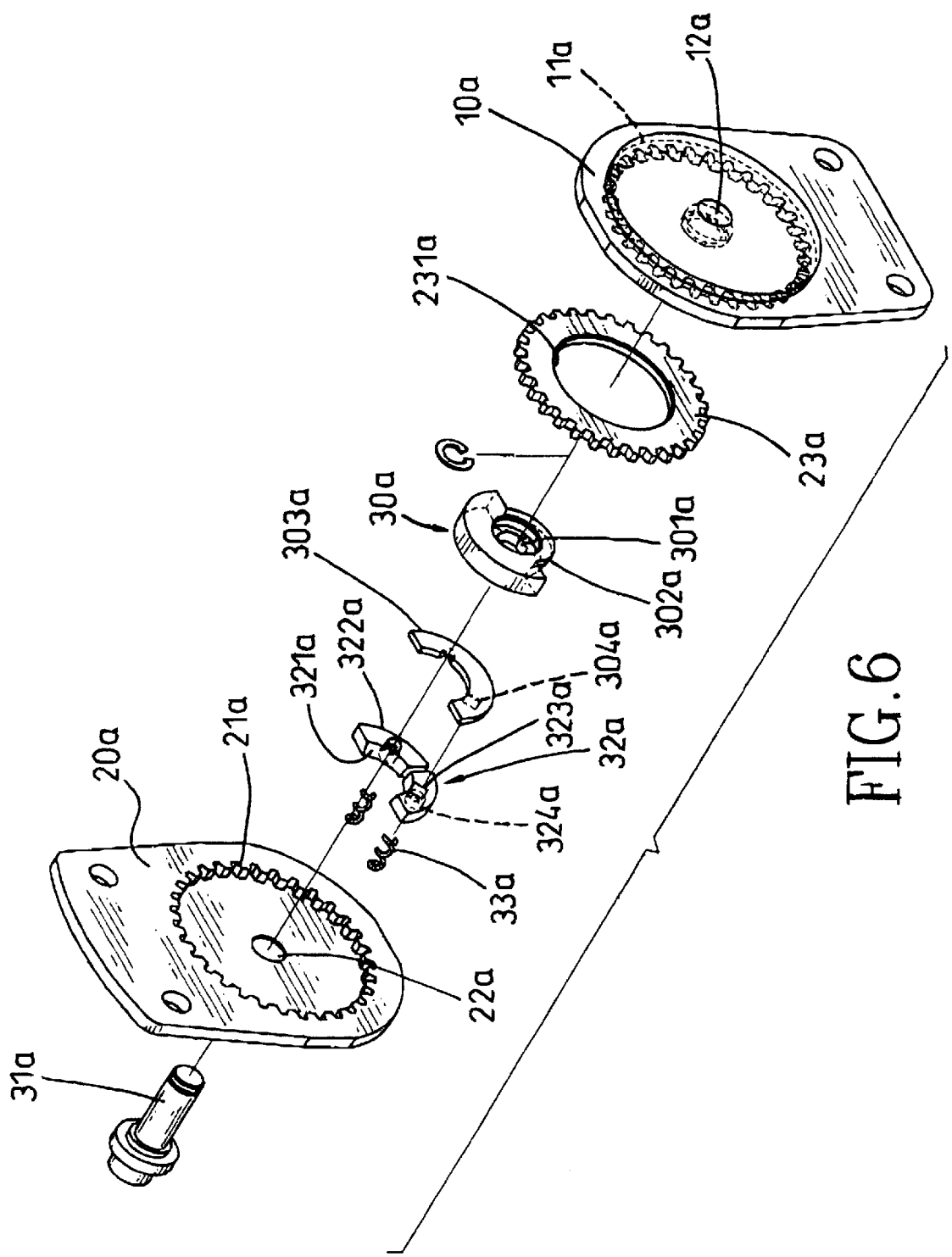
FIG. 6 is an exploded perspective view of a fourth preferred embodiment of a joint in accordance with the present invention for adjusting the inclination of a seatback relative to a seat.
Figure 7:
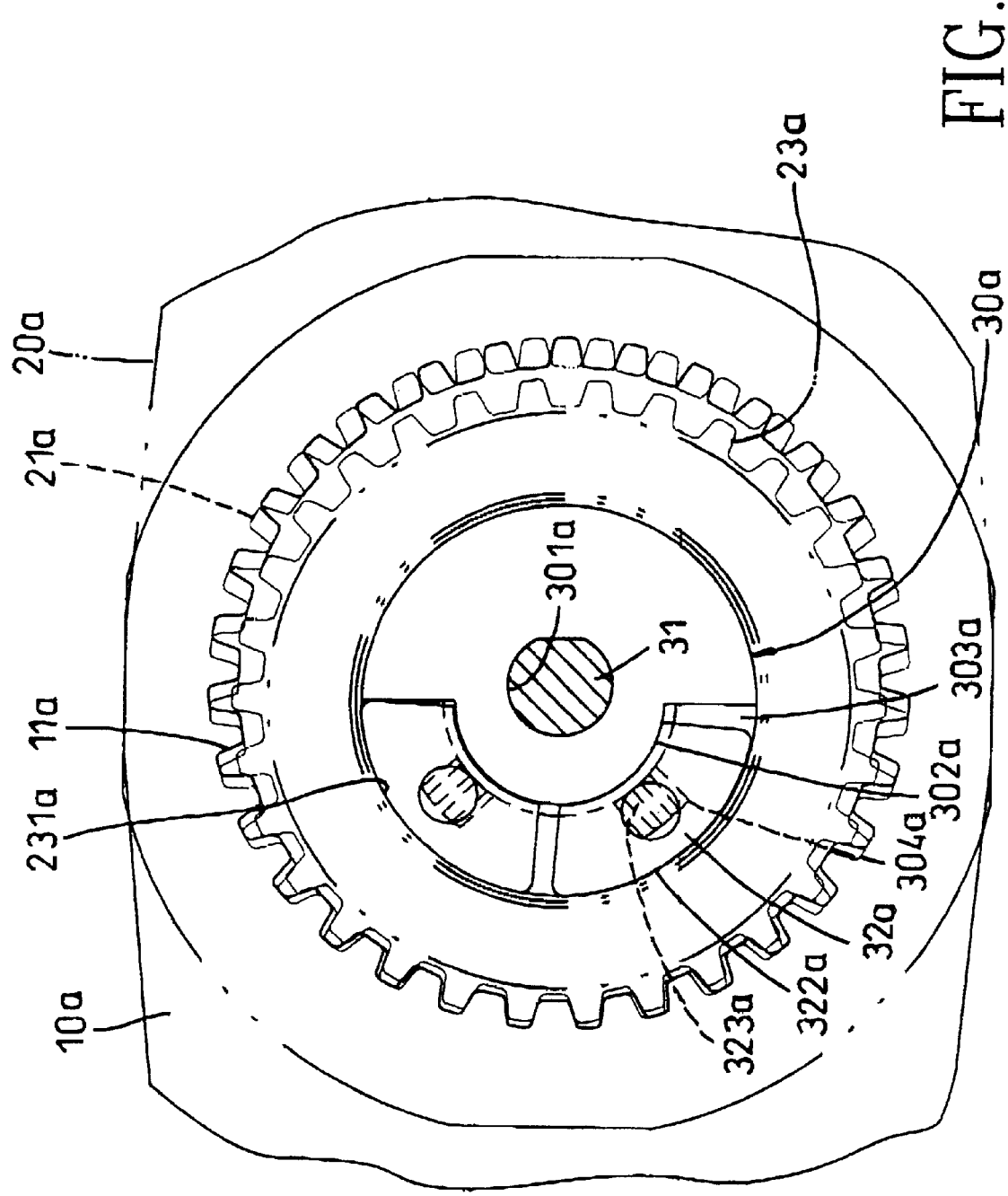
FIG. 7 is a plan view in partial section of the joint in FIG. 6.
Figure 8:
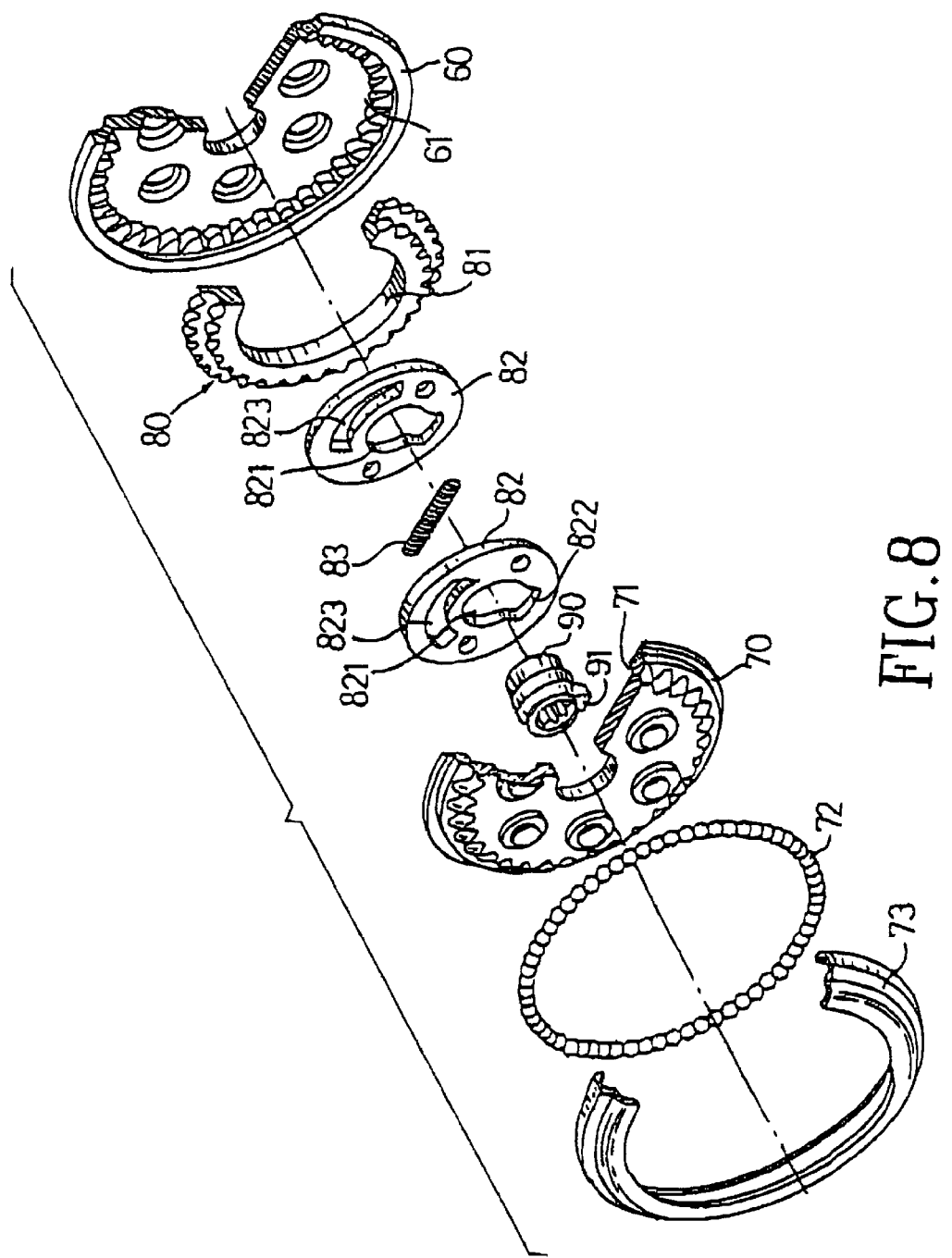
FIG. 8 is an exploded perspective view of a conventional joint for adjusting the inclination of a seatback relative to a seat.
Figure 9:
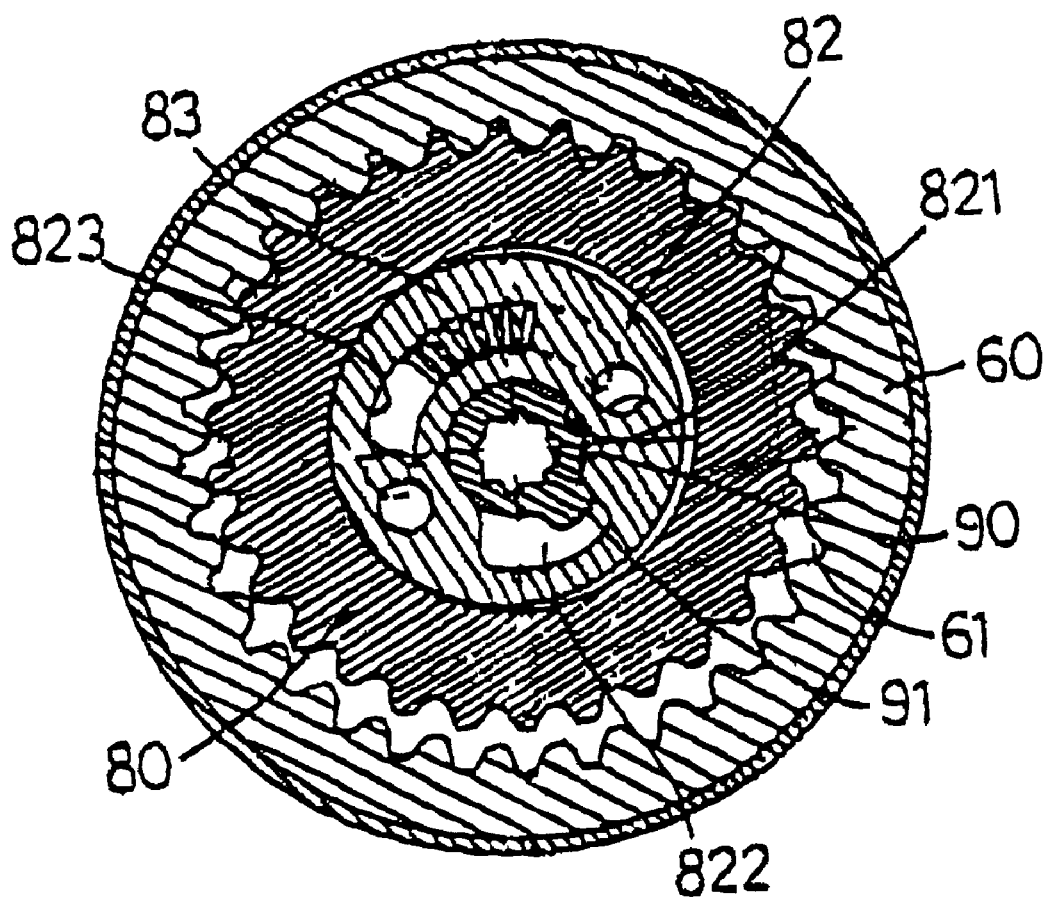
FIG. 9 is a cross-sectional side plan view of the conventional joint in FIG. 8.

With reference to FIGS. 6 and 7, another preferred embodiment of a joint in accordance with the present invention for the same purpose includes a first leaf (10a) and a second leaf (20a). The leaves (10a, 20a) respectively have an inner gear (11a, 21a) formed with an axial hole (12a, 22a). The leaves (10a, 20a) are arranged face to face in such a way that the axial holes (12a, 22a) are aligned with each other and recesses within the inner gears (11a, 21a) respectively define a chamber between the leaves (10a, 20a).

A planetary gear (23a) meshing with the inner gears (11a, 21a) of the leaves (10a, 20a) is received in the chamber in the leaves (10a, 20a). The planetary gear (21a) has a central hole (231a).

A driving wedge-shaped disk (30a) with a supporting base (303a) is received in the central hole (231a) of the planetary gear (21a). A non-circular hole (301a) is defined in the disk (30a). A block (302a) with a wedge-shaped resistant surface is integrally formed on the disk (30a) and around the hole (301a). At least one wedge-shaped recess (304a) is defined in the supporting base (303a).

At least one driven wedge-shaped segment (32a) is mounted around driving wedge-shaped disk (30a). Each segment (32a) has an inner wedge-shaped surface (321a) and an outer periphery (322a). The inner wedge-shaped surface (321a) of each segment (32a) mates with the wedge-shaped resistant surface of the block (302a) on the driving wedge-shaped disk (30a). The outer periphery (322a) of each segment (32a) abuts against the inner surface of the central hole (231a) in the planetary gear (23a). At least one wedge portion (323a) is defined in each segment (32a) to correspond to one of the wedge-shaped recesses (304a) on the supporting base (303a). A resilient member (33a) is arranged between the second leaf (20a) and each segment (32a) to provide a pushing force on the segment (32a). Consequently, the planetary gear (23a) is non-rotatable relative to the inner gears (11a, 21a) in the first leaf (10a) and the second leaf (20a). The angle between the second leaf (20a) and the first leaf (10a) is fixed so that the angle between the seatback and the seat is also fixed.

A shaft (31a) extends through the axial holes (12a, 22a) of the leaves (10a, 20a), the non-circular hole (301a) in the driving wedge-shaped disk (30a).

When the shaft (31a) is rotated, the driving wedge-shaped disk (30a) is rotated with the shaft (31a). The wedge-shaped recesses (304a) in the supporting base (303a) will push against the wedge portions (323a) on the driven wedge-shaped segments (32). Thus the segments (32a) are moved in the axial and radial directions along the driving wedge-shaped disk (30a) simultaneously. It is apparent that sufficient clearance will then occur between the meshing teeth of the inner gears (11a, 201a) and the planetary gear (21a), which ensures the smooth rotation of the second leaf (20a) with respect to the first leaf (10a).

From the foregoing description, the invention has the advantage of preventing any possible shaking of the seatback with respective to the seat.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clearance take-up joint comprising:
   a first leaf having an inner gear formed with an axial hole;
   a second leaf having a central hole defined in the second leaf and an external gear meshing with the inner gear in the first leaf;
   a cap securely attached to the first leaf and having an aperture defined in the cap aligning with the central hole in the second leaf and the axial hole in the first leaf;
   a driving wedge-shaped disk mounted in the central hole in the second leaf and having a block with a wedge-shaped resistant surface;
   a supporting base extending from the driving wedge-shaped disk;
   a shaft extending through the axial hole in the first leaf, the driving wedge-shaped disk and the aperture in the cap;
   at least one driven wedge-shaped segment mounted around the driving wedge-shaped disk, each at least one driven wedge-shaped segment having an inner wedge-shaped surface mating with the wedge-shaped resistant surface of the block on the driving wedge-shaped disk and an outer periphery abutting against the inner surface of the central hole in the second leaf;
   a wedge arrangement arranged between the supporting base and each at least one driven wedge-shaped segment; and
   a resilient member arranged between the cap and each at least one driven wedge-shaped segment.

2. The joint as claimed in claim 1, wherein the driving wedge-shaped disk has a non-circular hole defined in the driving wedge-shaped disk for the shaft extending through the non-circular hole.

3. The joint as claimed in claim 1, wherein the wedge arrangement has at least one wedge portion formed on each at least one driven wedge-shaped segment; and
   a wedge-shaped recess defined in the supporting base and corresponding to respective each of the at least one wedge portion on each of the at least one driven wedge-shaped segment.

4. The joint as claimed in claim 1, wherein the wedge arrangement has at least one wedge-shaped recess defined in each at least one driven wedge-shaped segment; and
   a wedge portion is formed on the supporting base and corresponding to respective each of the at least one wedge-shaped recess in each of the at least one driven wedge-shaped segment.

5. The joint as claimed in claim 1, wherein the resilient member is a spring; and
   a recess is defined in each at least one driven wedge-shaped segment to receive one end of a spring.

6. The joint as claimed in claim 1, wherein the resilient member is a resilient tab integrally formed on a disk.

7. The joint as claimed in claim 1, wherein the driving wedge-shaped disk and the supporting base are made separately.

8. A clearance take-up joint comprising:
   a first leaf having a first inner gear formed with a first axial hole;
   a second leaf having a second inner gear formed with a second axial hole aligning with the first axial hole in the first leaf, recesses within the first and the second inner gears define a chamber between the leaves;
   a planetary gear mounted in the chamber between the leaves and meshing with the inner gears in the leaves, the planetary gear having a central hole;
   a driving wedge-shaped disk received in the central hole in the planetary gear and having a block with a wedge-shaped resistant surface;
   a supporting base extending from the driving wedge-shaped disk;
   a shaft extending through the axial holes of said leaves and the driving wedge-shaped disk;
   at least one driven wedge-shaped segment mounted around the driving wedge-shaped disk, each at least one driven wedge-shaped segment having an inner wedge-shaped surface mating with the wedge-shaped resistant surface of the block on the driving wedge-shaped disk and an outer periphery abutting against the inner surface of the central hole in the planetary gear;

a wedge arrangement arranged between the supporting base and each at least one driven wedge-shaped segment; and a resilient member arranged between the second leaf and each at least one driven wedge-shaped segment.

9. The joint as claimed in claim 8, wherein the driving wedge-shaped disk has a non-circular hole defined in the driving wedge-shaped disk for the shaft extending through the non-circular hole.

10. The joint as claimed in claim 8, wherein the wedge arrangement has at least one wedge portion formed on each at least one driven wedge-shaped segment; and a wedge-shaped recess defined in the supporting base and corresponding to respective each of the at least one wedge portion on each of the at least one driven wedge-shaped segment.

11. The joint as claimed in claim 8, wherein the wedge arrangement has at least one wedge-shaped recess defined in each at least one driven wedge-shaped segment; and a wedge portion is formed on the supporting base and corresponding to respective each of the at least one wedge-shaped recess in each of the at least one driven wedge-shaped segment.

12. The joint as claimed in claim 8, wherein the resilient member is a spring; and a recess is defined in each at least one driven wedge-shaped segment to receive one end of the spring.

13. The joint as claimed in claim 8, wherein the resilient member is a resilient tab integrally formed on a disk.

14. The joint as claimed in claim 8, wherein the driving wedge-shaped disk and the supporting base are made separately.

* * * * *